(12) United States Patent
Cho et al.

(10) Patent No.: US 7,293,167 B2
(45) Date of Patent: Nov. 6, 2007

(54) METHOD AND APPARATUS FOR DRIVING A NON-NATIVE SATA HARD DISK

(75) Inventors: Yeh Cho, Taipei (TW); Chung-Ching Huang, Taipei (TW)

(73) Assignee: VIA Technologies Inc., Taipei (TW)

( * ) Notice: Subject to any disclaimer, the term of this patent is extended or adjusted under 35 U.S.C. 154(b) by 519 days.

(21) Appl. No.: 10/965,405

(22) Filed: Oct. 14, 2004

(65) Prior Publication Data
US 2005/0086459 A1    Apr. 21, 2005

(30) Foreign Application Priority Data
Oct. 15, 2003  (TW) .............................. 92128631 A

(51) Int. Cl.
*G06F 9/00*      (2006.01)
*G06F 15/177*    (2006.01)
*G06F 1/24*      (2006.01)
(52) U.S. Cl. ............................... 713/1; 713/2; 713/100
(58) Field of Classification Search .................... 713/1, 713/2, 100
See application file for complete search history.

(56) References Cited

U.S. PATENT DOCUMENTS

| 6,845,420 B2 * | 1/2005 | Resnick ....................... 710/303 |
| 6,854,045 B2 * | 2/2005 | Ooi et al. .................... 711/202 |
| 6,976,190 B1 * | 12/2005 | Goldstone .................... 714/42 |
| 6,978,337 B1 * | 12/2005 | Chang ........................ 710/306 |

* cited by examiner

*Primary Examiner*—Thomas Lee
*Assistant Examiner*—Ji H Bae
(74) *Attorney, Agent, or Firm*—Thomas, Kayden, Horstemeyer & Risley

(57) ABSTRACT

A method and apparatus for driving a non-native SATA hard disk applied in a computer is provided. The computer includes a basic input/output system (BIOS) and an operating system (OS), both of which support an advanced configuration and power interface (ACPI). The non-native SATA hard disk includes a conversion interface and a parallel ATA (PATA) internal disk. First, issue an interrupt. Then, process an interrupt handle routine for detecting and saving the timing mode of the PATA internal disk. Next, load a default IDE driver. Then, report the saved timing mode. Finally, set the SATA hard disk according to the timing mode.

21 Claims, 3 Drawing Sheets

METHOD AND APPARATUS FOR DRIVING A NON-NATIVE SATA HARD DISK

This application claims the benefit of Taiwan application Serial No. 92128631, filed Oct. 15, 2003, the subject matter of which is incorporated herein by reference.

BACKGROUND OF THE INVENTION

1. Field of the Invention

The invention relates in general to a method and apparatus for driving an SATA hard disk, and more particularly to a method and apparatus for driving a non-native SATA hard disk.

2. Description of the Related Art

A serial ATA (SATA) hard disk is for replacing a conventional parallel ATA (PATA) hard disk. The PATA hard disk adopts a parallel transmission, so the PATA hard disk requires more pins and a wider cable line. Moreover, the length of the cable is restricted in order to achieve a synchronized transmission. On the other hand, the SATA hard disk adopts a serial transmission, so the number of pins used is smaller, the cable line can be longer and the assembly is easier. Moreover, the speed of the SATA hard disk is as fast as 150 MB/s and may be further speeded up by means of multi-linking.

During the transitional period from the PATA hard disk to the SATA hard disk, native SATA hard disk is still lack of a matured technology, so non-native SATA hard disk is used as a transitional product. The non-native SATA hard disk uses the same interface with the native SATA hard disk and has the same feature of using fewer pins. However, unlike the native SATA hard disk, the non-native SATA hard disk adopts a PATA internal disk and uses a conversion interface disposed within to convert a serial SATA signal into a parallel PATA signal and vice versa.

FIG. 1 is a block diagram of a non-native SATA hard disk. Non-native SATA hard disk 100 includes a conversion interface 101 and a PATA internal disk 102. The non-native SATA hard disk 100 has a serial cable 103 through which a serial SATA signal is transmitted to or received from a computer. The PATA internal disk 102 has a parallel cable 104 through which a parallel signal is transmitted to or received from the conversion interface 101. The conversion interface 101 is a bridge connecting the PATA signal and the SATA signal.

When a conventional PATA hard disk is used, the operating system needs to set a timing mode for the PATA hard disk and the hard disk host. The timing mode, which shows the transmission speed between the PATA hard disk and the hard disk host, has various modes listed in ascending order of transmission speed as follows: PIO modes 0~4, Multi-word DMA modes 0~2, Ultra DMA modes 0~6. The BIOS inquires the type of the PATA hard disk and the timing mode supported thereby when a computer is booted.

After the computer is booted, the operating system (OS) sets appropriate timing according to the mode supported by the hard disk host and the mode supported by the PATA hard disk.

Unlike the PATA hard disk which requires the setting of timing mode, the SATA hard disk does not require the setting of timing mode because a packed type of transmission is adopted. The non-native SATA hard disk has a PATA internal disk disposed within, so the setting of timing mode is still required of the PATA internal disk inside the non-native SATA hard disk. However, ordinary BIOS and OS only regards the non-native SATA hard disk as an native SATA hard disk and will not automatically set the PATA internal disk inside the non-native SATA hard disk. The non-native SATA hard disk still can be used despite that the timing mode of the PATA internal disk is not set. Under this circumstance, the PATA internal disk will operate under a default mode, a PIO mode 0 for instance, reducing the speed of data accessing.

FIG. 2 is a conventional method of driving a non-native SATA hard disk. First, in step 110, the BIOS enters into a power on self test (POST) stage for initializing the peripheral of the computer such as display card, memory, central processing unit and hard disk when the computer is booted, then the BIOS calls an SATA option ROM provided by the manufacturer of the non-native SATA hard disk. Next, go to step 120: the OS is booted. After that, go to step 130: the OS loads the SATA driver provided by the manufacturer, so the operating system may access the SATA hard disk with best efficiency by means of the SATA driver provided by the manufacturer. However, such a practice requires the manufacturer of the non-native SATA hard disk to develop an SATA option ROM and an SATA driver, not only increase costs and time with regard to research and development, but also needs additional purchasing cost of the SATA driver and SATA option ROM, leading to an increase in manufacturing costs of the system manufacturer.

SUMMARY OF THE INVENTION

It is therefore an object of the invention to provide a method of using a default driver of an operating system to drive a non-native SATA hard disk. The BIOS may dispense with an SATA option ROM, saving costs and time with regard to the research and development of the SATA driver and SATA option ROM and the purchasing cost as well and reducing the purchasing cost of the system manufacturer.

It is another object of the invention to provide a method and apparatus for driving a non-native SATA hard disk applied in a computer. The computer includes a basic input/output system (BIOS) and an operating system (OS), both of which support an advanced configuration and power interface (ACPI). The non-native SATA hard disk includes a conversion interface and a parallel ATA (PATA) internal disk. First, issue an interrupt. Then, process an interrupt handle routine for detecting and saving the timing mode of the PATA internal disk. Next, load a default IDE driver. Then, report the saved timing mode. Finally, set the SATA hard disk according to the timing mode.

It is another object of the invention to provide a computer including a BIOS and an OS, both of which support ACPI, and a non-native SATA hard disk. The non-native SATA hard disk, which transmits or receives a serial SATA signal, includes a PATA internal disk for transmitting/receiving a parallel PATA signal and a conversion interface for bridging the parallel PATA signal and the serial SATA signal. When the OS is booted, an initialization function of the ACPI is performed to issue an interrupt. When the interrupt occurs, process an interrupt handle routine for detecting and saving the timing mode of the PATA internal disk inside the non-native SATA hard disk. When the interrupt is over, the OS loads a default IDE driver and executes the fetching mode function of the ACPI to report and save the timing mode. After receiving and saving the timing mode, the OS sets the SATA hard disk accordingly.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention uses a basic input/output system (BIOS) and an operating system (OS), both of which support an advanced configuration and power interface (ACPI), to achieve a method of using a default IDE driver of an OS to drive a non-native SATA hard disk The ACPI defines an interface connecting software with hardware, so that the OS may process the setting of configuration and provide power for the hardware of a computer accordingly. The ACPI provides a set of ACPI source language code (ASL), including various ACPI functions, which may be called by the OS. When the OS is booted, an ACPI initialization function is called first, and various hardware drivers are loaded in succession to process the setting of hardware configuration.

The timing mode and other information of a conventional PATA hard disk are obtained by the BIOS when the computer is booted. However, when a computer having a non-native SATA hard disk is booted, a BIOS lacking of a SATA option ROM cannot recognize the non-native SATA hard disk and no processing will be undertaken. Since the OS does not process the setting of the PATA hard disk inside the SATA hard disk, so the best way is to assume a default mode, i.e., the PIO mode 0. However, such a practice will greatly reduce the operation speed of the SATA hard disk. The invention provides a method of driving a non-native SATA hard disk when the BIOS is lack of an SATA option ROM.

The invention inserts a paragraph of program codes into the ACPI initialization function to issue a system management interrupt (SMI). After the SMI is issued, an SMI handle routine is performed to inquire the PATA internal disk inside the SATA hard disk, so that information such as timing mode is obtained and saved, and will be used when the OS is booted again.

Figure 1:
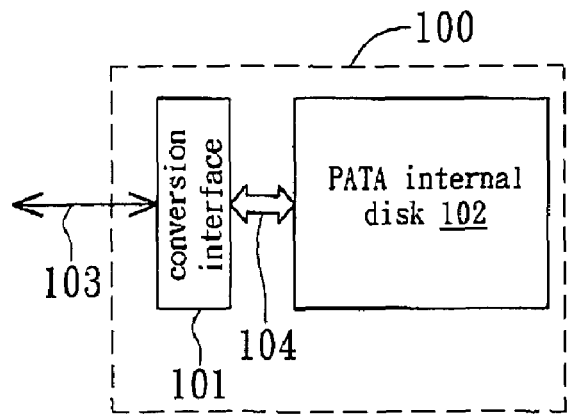
FIG. 1 is a block diagram of a non-native SATA hard disk.
Figure 2:
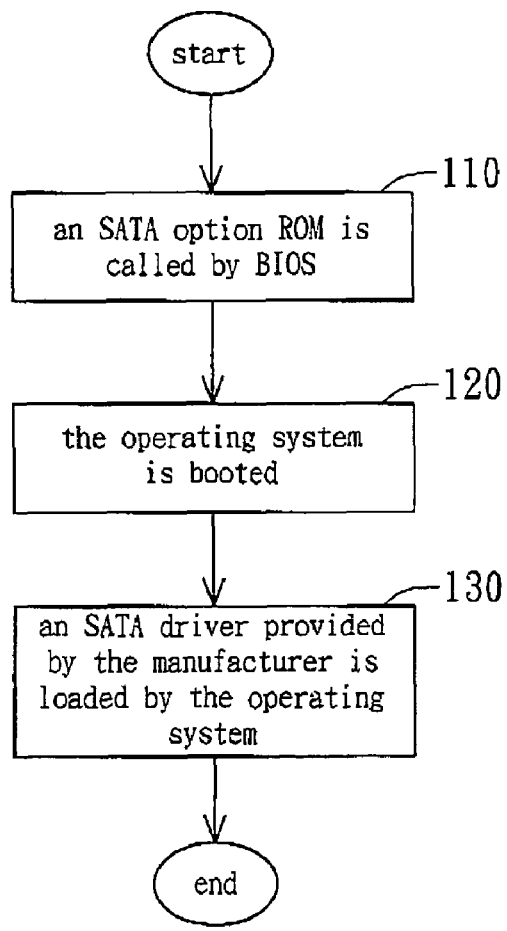
FIG. 2 is a conventional method of driving a non-native SATA hard disk.
Figure 3:
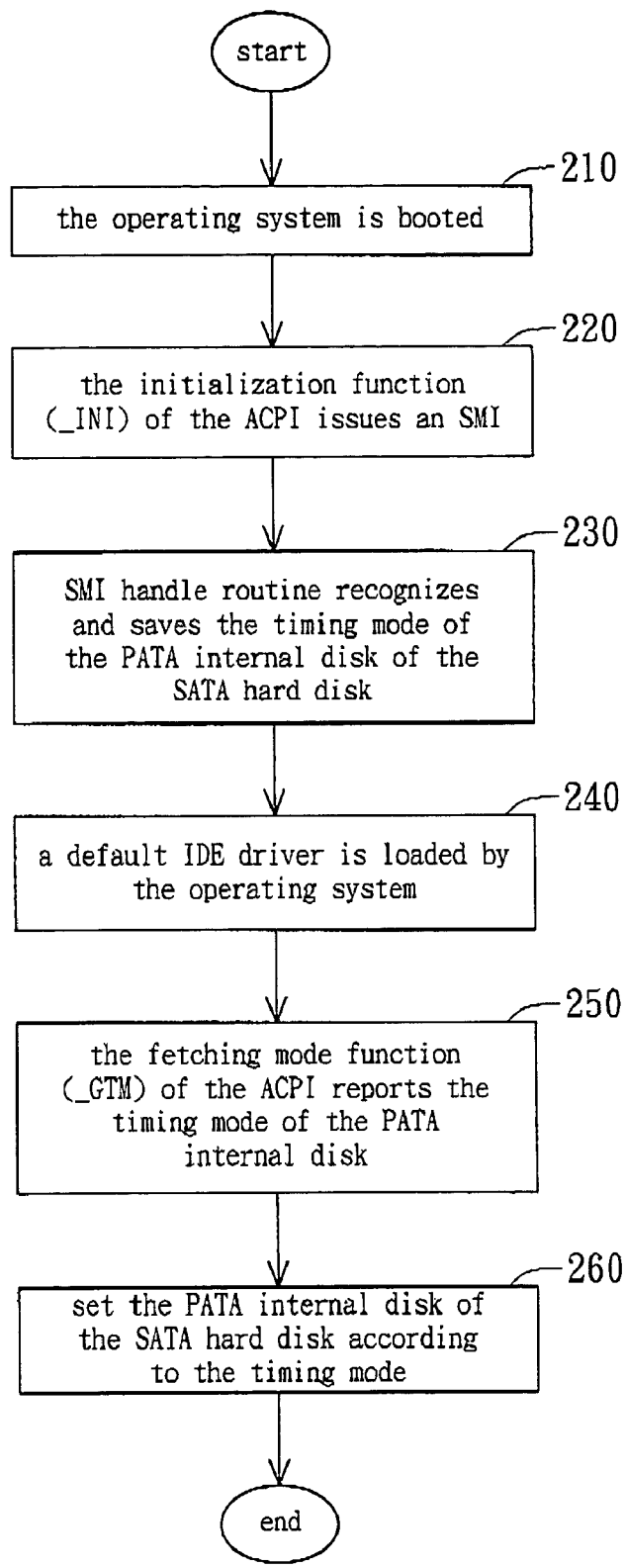
FIG. 3 is a method of driving a non-native SATA hard disk according to preferred embodiment one of the invention.

FIG. 3 is a method of driving a non-native SATA hard disk according to preferred embodiment one of the invention. First, in step 210, the BIOS enters into a power on self test (POST) stage for initializing the peripheral of the computer such as display card, memory, central processing unit and hard disk, then the OS is booted as shown in step 210. Next, execute an ACPI initialization function to issue an SMI as shown in step 220. Next, go to step 230, after the SMI is issued, an SMI handle routine is processed to inquire the PATA internal disk inside the SATA hard disk to obtain and save information such as the timing mode. The SMI, which has the highest authority regarding interrupt, is transparent to the OS. Following that, go to step 240: the OS loads a default IDE driver when the SMI is over, meanwhile, the OS calls the ACPI initialization function to obtain the timing mode saved in the non-native SATA hard disk during the SMI handle routine. After that, go to step 250, the OS receives the timing mode reported by an ACPI fetching mode function. Last, in step 260, the OS process the setting of the SATA hard disk accordingly to optimize the non-native SATA hard disk.

The conventional method of driving a PATA hard disk uses the BIOS to detect the timing mode, but the timing mode of the non-native SATA hard disk cannot be detect by the BIOS. According to the invention, an ACPI function issues an interrupt, then a handle routine is performed to obtain a timing mode of the non-native SATA hard disk, while the OS obtains the timing mode by means of the ACPI function and process setting accordingly. This practice does not change the original process of driving the hardware by the OS, so a default IDE driver of the OS may be used to drive the non-native SATA hard disk.

Figure 4:
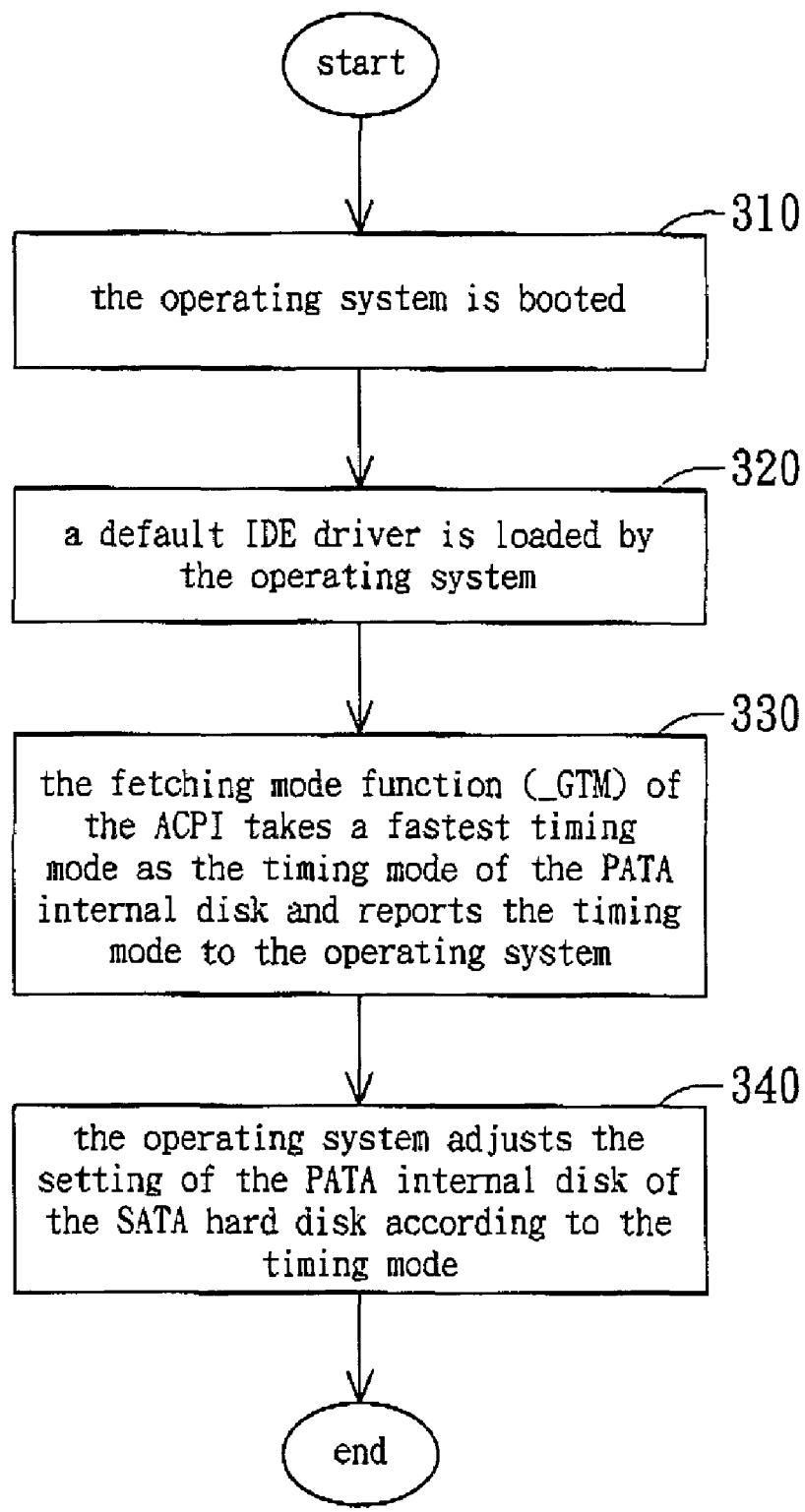
FIG. 4 is a method of driving a non-native SATA hard disk according to preferred embodiment two of the invention.

FIG. 4 is a method of driving a non-native SATA hard disk according to preferred embodiment two of the invention. First, the BIOS enters into a power on self test (POST) stage, then the OS is booted as shown in step 310. Next, in step 320, the OS loads a default IDE driver. Then, in step 330, the OS calls an ACPI fetching mode function. Meanwhile, the fetching mode function takes the fastest timing mode, the Ultra DMA 6 for instance, as the timing mode of the PATA internal disk and reports the timing mode to the OS. Following that, in step 340, the OS sets the non-native SATA hard disk according to the timing mode reported by the fetching mode function. If the fastest timing mode reported does not fit the PATA internal disk inside the non-native SATA hard disk, the OS will automatically adjust the non-native SATA hard disk to operate under a best timing mode.

The non-native SATA hard disk disclosed in the above preferred embodiment according to the invention dispenses the manufacturer with additional SATA option ROM and SATA driver, saving the time and costs with regard to research and development of SATA option ROM and SATA driver. Moreover, the invention also saves system manufacturer the purchasing cost of SATA option ROM and SATA driver.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of driving a non-native SATA hard disk applied in a computer, wherein the computer comprises a basic input/output system (BIOS) and an operating system (OS), both of which support an advanced configuration and power interface (ACPI), while the non-native SATA hard disk comprises a conversion interface and a PATA internal disk, the driving method comprises:
    (a) executing an ACPI initialization function (_INI), which issues an interrupt;
    (b) performing a handle routine according to the interrupt to detect and save a timing mode of the PATA internal disk of the non-native SATA hard disk;
    (c) loading a default IDE driver;
    (d) executing an ACPI fetching mode function (_GTM) to report the saved timing mode; and
    (e) setting the PATA internal disk according to the timing mode.

2. The driving method according to claim 1 is executed at the early stage when the OS is booted.

3. The driving method according to claim 1, wherein the interrupt is a software management interrupt (SMI).

4. The driving method according to claim 1, wherein step (a), step (c), step (d) and step (e) are executed by the OS.

5. The driving method according to claim 1, wherein the timing mode is among one of PIO modes 0~4, Multi-word DMA modes 0~2, Ultra DMA modes 0~6.

6. A method of driving a non-native SATA hard disk applied in a computer, wherein the computer comprises a basic input/output system (BIOS) and an operating system (OS), both of which support an advanced configuration and power interface (ACPI), while the non-native SATA hard disk comprises a conversion interface and a PATA internal disk, the driving method comprises:
   (a) issuing an interrupt;
   (b) performing a handle routine according to the interrupt to detect and save a timing mode of the PATA internal disk of the non-native SATA hard disk;
   (c) loading a default IDE driver;
   (d) reporting the saved timing mode; and
   (e) setting the PATA internal disk according to the timing mode.

7. The driving method according to claim 6 is executed at the early stage when the OS is booted.

8. The driving method according to claim 6, wherein the interrupt is a software management interrupt (SMI).

9. The driving method according to claim 6, wherein the interrupt in step (a) is issued by an initialization function of the ACPI.

10. The driving method according to claim 9, wherein the initialization function is called by the OS.

11. The driving method according to claim 6, wherein step (c) and step (e) are executed by the OS.

12. The driving method according to claim 6, wherein step (d) is executed by a fetching mode function of the ACPI.

13. The driving method according to claim 12, wherein the fetching mode function is called by the OS.

14. The driving method according to claim 6, wherein the timing mode is among one of PIO modes 0~4, Multi-word DMA modes 0~2, Ultra DMA modes 0~6.

15. A computer, comprising:
   a basic input/output system (BIOS) and an operating system (OS), both of which support an advanced configuration and power interface (ACPI); and
   a non-native SATA hard disk for transmitting/receiving a serial SATA signal, wherein the non-native SATA hard disk comprising:
      a PATA internal disk for transmitting/receiving a parallel PATA signal; and
      a conversion interface for bridging the parallel PATA signal and the serial SATA signal;
   wherein the OS is for issuing an initialization function of the ACPI when the OS is booted;
   wherein the computer is for executing an interrupt handle routine to detect and to save a timing mode of the PATA internal disk of the non-native SATA hard disk when an interrupt occurs;
   wherein the OS is for loading a default IDE driver and executing a fetching mode function, which reports the saved timing mode, when the interrupt is over;
   wherein the OS is for setting the SATA hard disk accordingly after receiving the saved timing mode.

16. The computer according to claim 15, wherein the interrupt is a software management interrupt (SMI).

17. The computer to claim 15, wherein the timing mode is among one of PIO modes 0~4, Multi-word DMA modes 0~2, Ultra DMA modes 0~6.

18. A method of driving a non-native SATA hard disk applied in a computer, wherein the computer comprises a basic input/output system (BIOS) and an operating system (OS), both of which support an advanced configuration and power interface (ACPI), while the non-native SATA hard disk comprises a conversion interface and a PATA internal disk, the driving method comprises:
   (a) booting the OS;
   (b) loading a default IDE driver;
   (c) reporting a fastest timing mode; and
   (d) setting the PATA internal disk according to the timing mode reported.

19. The driving method according to claim 18, wherein step (b) and step (d) are executed by the OS.

20. The driving method according to claim 18, wherein step (c) is executed by a fetching mode function of the ACPI.

21. The driving method according to claim 20, wherein the fetching mode function is called by the OS.

* * * * *